United States Patent
Tezuka

(10) Patent No.: US 7,654,961 B2
(45) Date of Patent: Feb. 2, 2010

(54) ULTRASONIC PROBE

(75) Inventor: Satoru Tezuka, Tochigi-ken (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 229 days.

(21) Appl. No.: 11/249,371

(22) Filed: Oct. 14, 2005

(65) Prior Publication Data

US 2007/0244392 A1 Oct. 18, 2007

(30) Foreign Application Priority Data

Oct. 15, 2004 (JP) .............................. 2004-301324

(51) Int. Cl.
*A61B 8/00* (2006.01)

(52) U.S. Cl. ....................... 600/459; 600/437; 367/140; 367/153

(58) Field of Classification Search ................. 600/459, 600/437; 310/327, 334, 336; 367/140, 153; 73/1.82

See application file for complete search history.

(56) References Cited

U.S. PATENT DOCUMENTS

| | | | |
|---|---|---|---|
| 5,267,221 A | 11/1993 | Miller et al. | |
| 5,311,095 A | 5/1994 | Smith et al. | |
| 5,329,498 A | 7/1994 | Greenstein | |
| 5,744,898 A * | 4/1998 | Smith et al. | ................. 310/334 |
| 6,530,887 B1 * | 3/2003 | Gilbert et al. | ............... 600/459 |
| 6,582,371 B2 * | 6/2003 | Miller | ......................... 600/459 |
| 6,659,955 B1 * | 12/2003 | Marian, Jr. | .................. 600/459 |
| 6,894,425 B1 * | 5/2005 | Solomon et al. | ............ 310/334 |

FOREIGN PATENT DOCUMENTS

| | | | |
|---|---|---|---|
| JP | 62-2799 | | 8/1987 |
| JP | 2001292496 A | * | 10/2001 |

OTHER PUBLICATIONS

Savord, et al., "Fully Sampled Matrix Transducer for Real Time 3D Untrasonic Imaging", IEEE Ultrasonics Symposium, 2003, pp. 945-953.
Greenstein, et al., "A 2.5 MHz 2D Array with Z-Axis Electrically Conductive Backing", IEEE Transactions on UFFC, vol. 44, No. 5, Sep. 1997, pp. 970-977.
Bureau, et al., A Two-Dimensional Transducer Array for Real Time 3D Medical Ultrasound Imaging, IEEE Ultrasonics Symposium, 1998, pp. 1065-1068.

* cited by examiner

*Primary Examiner*—Brian Casler
*Assistant Examiner*—Peter Luong
(74) *Attorney, Agent, or Firm*—Oblon, Spivak, McClelland, Maier & Neustadt, L.L.P.

(57) ABSTRACT

An ultrasonic probe includes ultrasonic oscillating elements arranged in a two-dimensional array shape, connection leads connected to the ultrasonic oscillating elements, and at least one board to connect the ultrasonic oscillating elements and integrated circuits. The board includes a first part having through-holes which are electrically connected to the connection leads when the connection leads are inserted, and second parts having bendable portions configured to connect the first part and the integrated circuits.

18 Claims, 14 Drawing Sheets

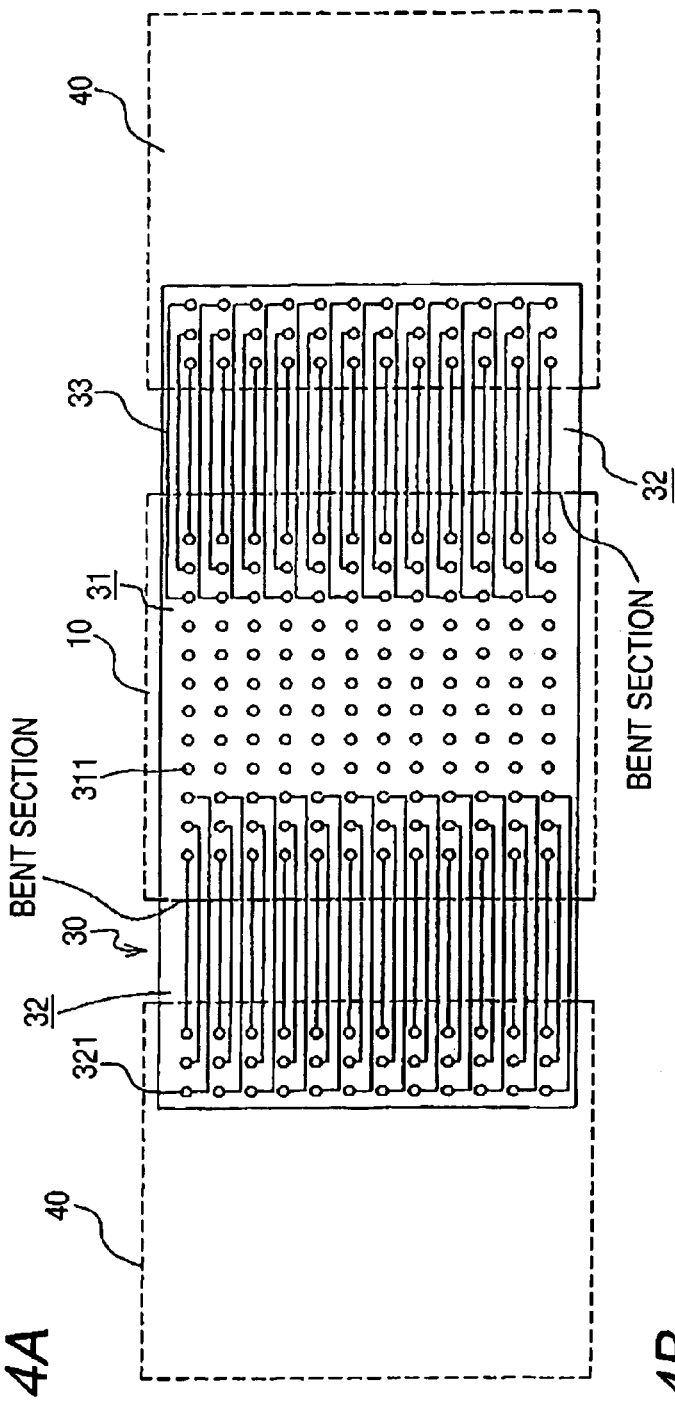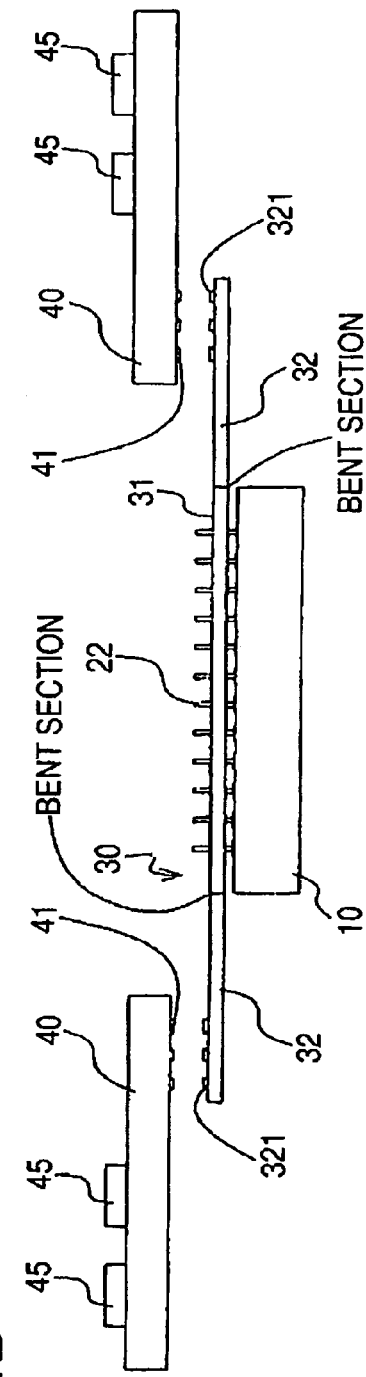
FIG. 4A
FIG. 4B

BENT SECTION

BENT SECTION

BENT SECTION

ULTRASONIC PROBE

CROSS REFERENCE TO RELATED APPLICATION

This application is based upon and claims the benefit of priority under 35 U.S.C. §119 from the prior Japanese Patent Application No. JP2004-301324 filed on Oct. 15, 2004, the entire contents of which are incorporated herein by reference.

BACKGROUND OF THE INVENTION

1. Field of the Invention

Exemplary aspects of the present invention relate to an ultrasonic probe used in an ultrasonic diagnostic apparatus.

2. Description of the Background

Related art ultrasonic probes used in an ultrasonic diagnostic apparatus have a cable assembly that exchanges electric signals between ultrasonic oscillating elements, which transmit and receive ultrasonic waves, and a main body of the ultrasonic diagnostic apparatus.

An ultrasonic probe that performs three-dimensional scanning using ultrasonic waves by deflecting and focusing ultrasonic beams omni-directionally has been developed.

Such ultrasonic probes include a two-dimensional array ultrasonic probe in which a large number of ultrasonic oscillating elements, which constitute an ultrasonic transducer, are arranged in a matrix shape.

Related art techniques to lead signals from the ultrasonic oscillating elements arranged two-dimensionally out to an integrated circuit in the ultrasonic probe and the main body of the ultrasonic diagnostic apparatus are described below.

U.S. Pat. No. 5,267,221 proposes a structure in which a hole is drilled in a backing material to lead signals out from the hole. JP-A-62-2799 describes a structure in which boards, corresponding to arrays of ultrasonic oscillating elements, are stacked to lead out signals.

The structure of two-dimensional array ultrasonic probes disclosed in these patent documents makes it possible to keep an acoustic characteristic of one element satisfactory.

U.S. Pat. No. 5,311,095 describes a structure in which a stacked board for extracting signals is arranged immediately below ultrasonic oscillating elements.

However, as a basic structure of the ultrasonic probe, the ultrasonic oscillating elements and the main body of the ultrasonic diagnostic apparatus are coupled by the cable assembly. In the two-dimensional array ultrasonic probe having a large number of very small ultrasonic oscillating elements, reception signals from the ultrasonic oscillating elements are also relatively small. Therefore, when the reception signals are passed directly through the cable assembly connected to the main body of the ultrasonic diagnostic apparatus, the reception signals are significantly attenuated because of an electrostatic capacity of the cable assembly. Thus, integrated circuits or the like, including a preamplifier or the like, to extract the reception signals from the ultrasonic oscillating elements satisfactorily, are required near the ultrasonic transducer.

Moreover, two-dimensional array ultrasonic probes require a large number of ultrasonic oscillating elements compared with that in a one-dimensional array. Therefore, when attempting to independently transmit signals from the each of the ultrasonic oscillating elements to the main body of the ultrasonic diagnostic apparatus, the number of cable cores of the cable assembly becomes large. This means that a cable connecting the ultrasonic probe and the main body of the ultrasonic diagnostic apparatus becomes thick and heavy. Such a structure does not support a method of using an ordinary ultrasonic diagnostic apparatus in which the ultrasonic probe has to be operated freely.

Therefore, the two-dimensional array ultrasonic probe adopts a construction to reduce the number of signals transmitted to the main body of the ultrasonic diagnostic apparatus by, for example, connecting ultrasonic signals from the ultrasonic oscillating elements commonly to one data line. Therefore, integrated circuits or the like, to reduce the number of signals by commonly connecting data lines, is required in the ultrasonic probe.

In the two-dimensional array ultrasonic probe, integrated circuits or the like, which control a large number of electric signals with low intensity, which are led from the group of ultrasonic oscillating elements by data lines, as described above, are mounted near the ultrasonic transducer. In addition, from the viewpoint of operability of the ultrasonic probe, it is necessary to keep a size of the ultrasonic probe equal to or smaller than a fixed size. Thus, the integrated circuits or the like are built at a high density.

As an example of a technique meeting the demand, as disclosed in JP-A-2001-292496, a construction to electrically and mechanically couple two kinds of boards substantially orthogonally using connection leads is proposed.

BRIEF SUMMARY OF THE INVENTION

An exemplary aspect of the invention provides a small ultrasonic probe.

An ultrasonic probe according to a first exemplary aspect of the invention to address and/or solve the above and/or other problems described above is an ultrasonic probe including: a plurality of ultrasonic oscillating elements arranged in a two-dimensional array; a plurality of connection leads connected to the plurality of ultrasonic oscillating elements; and a first board to connect the plurality of ultrasonic oscillating elements with at least one integrated circuit. The first board includes a first part having through-holes, which are electrically connected to the connection leads when the connection leads are inserted into the through holes; and at least one second part, a part of which is formed to be bendable, that connects the first part and the at least one integrated circuit.

BRIEF DESCRIPTION OF THE SEVERAL VIEWS OF THE DRAWINGS

The exemplary aspects of the invention and attendant advantages therefore are best understood from the following description of the non-limiting exemplary embodiments when read in connection with the accompanying Figures, wherein:

FIGS. 4A and 4B are a front view and a bottom view respectively, showing a positional relation between the ultrasonic transducer and an IC board on the one hand and the board on the other of the ultrasonic probe in the first exemplary embodiment of the invention;

DETAILED DESCRIPTION OF THE INVENTION

Exemplary of the invention will be hereinafter explained with reference to the accompanying drawings.

First Exemplary Embodiment

Figure 1A:
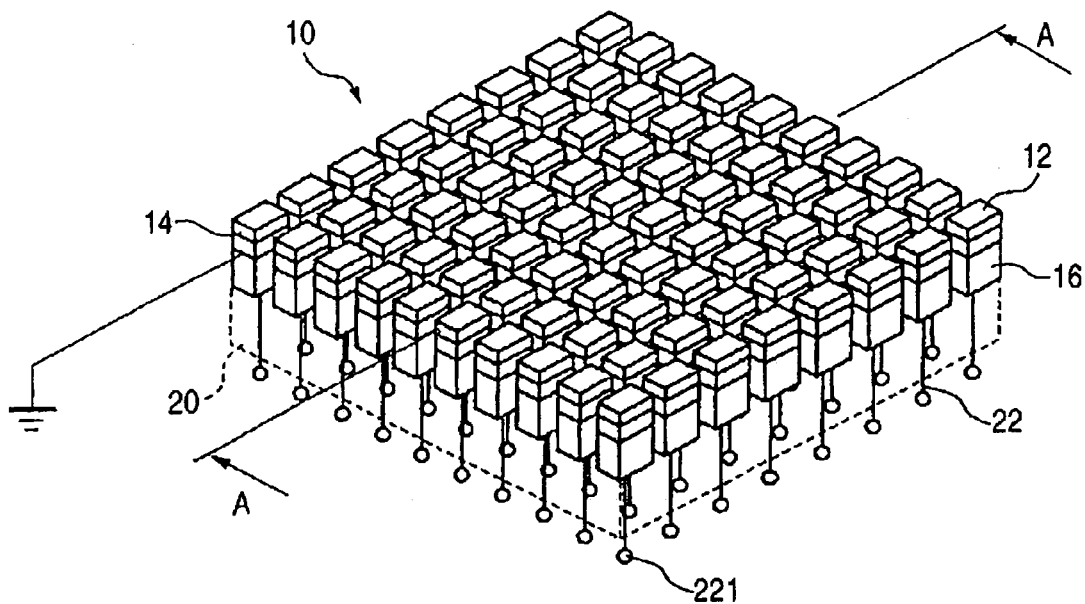
FIGS. 1A and 1B are a perspective view and a sectional view respectively, showing an ultrasonic transducer of an ultrasonic probe in a first exemplary embodiment of the invention.
Figure 1B:
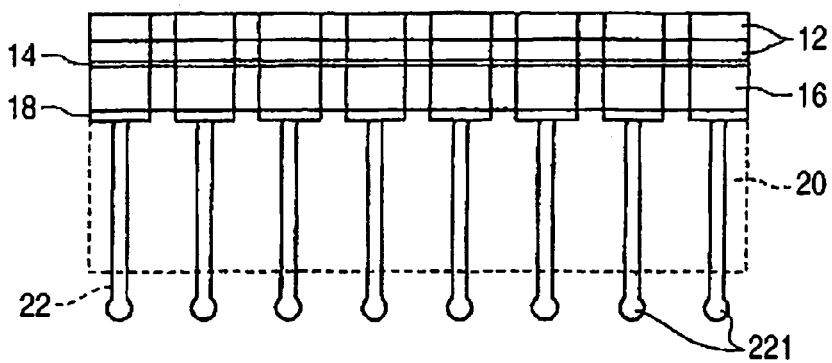

FIGS. 1A and 1B are schematic diagrams of a two-dimensional array ultrasonic transducer 10 included in an ultrasonic probe in a first exemplary embodiment of the invention. FIG. 1A is a perspective view of the two-dimensional array ultrasonic transducer 10 and FIG. 1B is a sectional view taken along A-A in FIG. 1A.

As shown in FIG. 1A, the two-dimensional array ultrasonic transducer 10 includes an acoustic matching layer 12, ground electrodes 14, ultrasonic oscillating elements 16, signal electrodes 18, a backing material 20, and connection leads 22.

The acoustic matching layer 12 is provided between a subject (not shown) and the ultrasonic oscillating elements 16. The acoustic matching layer 12 matches the acoustic impedances of the subject and the ultrasonic oscillating elements 16.

The ground electrodes 14 are provided at one end of respective ultrasonic oscillating elements 16. The ground electrodes 14 are connected to a ground.

The ultrasonic oscillating elements (piezoelectric members) 16 are piezoelectric elements including piezoelectric ceramics or the like and are arranged in a two-dimensional matrix shape. The arrangement in the two-dimensional matrix shape of the ultrasonic oscillating elements 16 makes it possible to perform omni-directional focusing and three-dimensional scanning of ultrasonic waves. In this exemplary embodiment, the ultrasonic oscillating elements 16 are piezoelectric elements. However, the ultrasonic oscillating elements 16 are not limited to piezoelectric elements. For example, the ultrasonic oscillating elements 16 may be any suitable element including CMUT elements or the like. The CMUT element is an ultrasonic oscillating element of an electrostatic capacity coupling type in which a thin film and a board are provided across an air-gap. Ultrasonic waves are transmitted by oscillation of the thin film. Oscillation of the thin film caused by reception of reflected waves of the ultrasonic waves is converted into an echo signal of an electric signal.

The backing material 20 is provided on rear surfaces of the ultrasonic oscillating elements 16. The backing material 20 is a material to eliminate unnecessary reflection and reverberation in a probe of ultrasonic pulses transmitted from the ultrasonic oscillating elements 16.

Paths to draw out the connection leads 22 from the signal electrodes 18 in a direction perpendicular to an arrangement surface of the ultrasonic oscillating elements 16 are formed in the backing material 20. End sections 221 of the connection leads 22 drawn out by the paths are arranged two-dimensionally in the same manner as the ultrasonic oscillating elements 16.

It is possible to manufacture the backing material 20 by, for example, stacking thin tabular backing materials, having a thickness the same as an arrangement pitch of the ultrasonic oscillating elements 16.

The thickness of the backing material 20 is set to sufficiently attenuate ultrasonic waves, in order to keep an acoustic characteristic of the ultrasonic transducer satisfactory.

The connection leads 22 have end sections 221 at one end. The connection leads 22 are connected to the signal electrodes 18 of respective ultrasonic oscillating elements 16 at the other end. The connection leads 22 are passed through the paths in the backing material 20 from the signal electrodes 18 in a direction perpendicular to an arrangement surface of the ultrasonic oscillation elements 16. Therefore, the end sections 221 of the connection leads 22 are arranged two-dimensionally on a surface of the backing material 20 on the opposite side of the ultrasonic oscillating elements 16.

In this exemplary embodiment, the end sections 221 of the connection leads 22 are arranged at the same arrangement pitch as the ultrasonic oscillating elements 16, specifically, in the same manner as the electrode arrangement. However, it is also possible to set an arrangement pitch of the end sections 221 of the connection leads 22 larger than the arrangement pitch of the ultrasonic oscillating elements 16. For example, when a two-dimensional array of the connection leads 22 is formed by sticking the tabular backing material and a data line pattern together, it is possible to realize the arrangement pitch of the end sections 221 of the connection leads 22 by forming a pattern of the connection leads 22 to be stuck so as to widen toward the end sections 221 of the connection leads 22.

In the explanation of this exemplary embodiment, one connection lead 22 and one signal electrode 18 are provided for each of the ultrasonic oscillating elements 16. However, the connection lead 22 and the signal electrode 18 may commonly connect plural ultrasonic oscillating elements to lead out the ultrasonic oscillating elements to one end section 221.

Figure 2A:
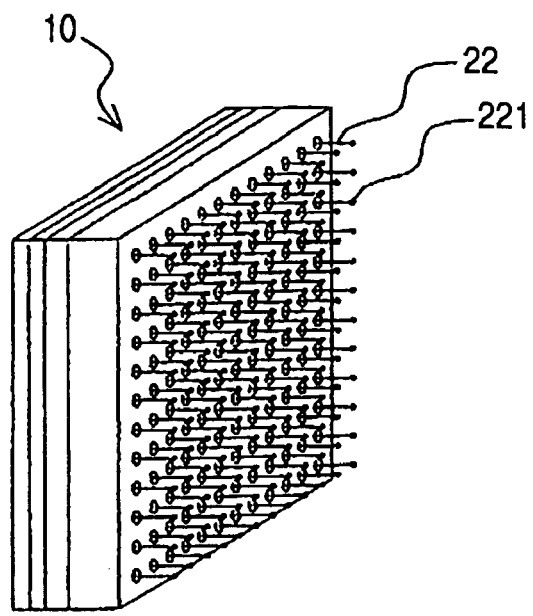
FIGS. 2A and 2B are perspective views showing a constitution of an ultrasonic transducer and a board connected to the ultrasonic transducer of the ultrasonic probe in the first exemplary embodiment of the invention.
Figure 2B:
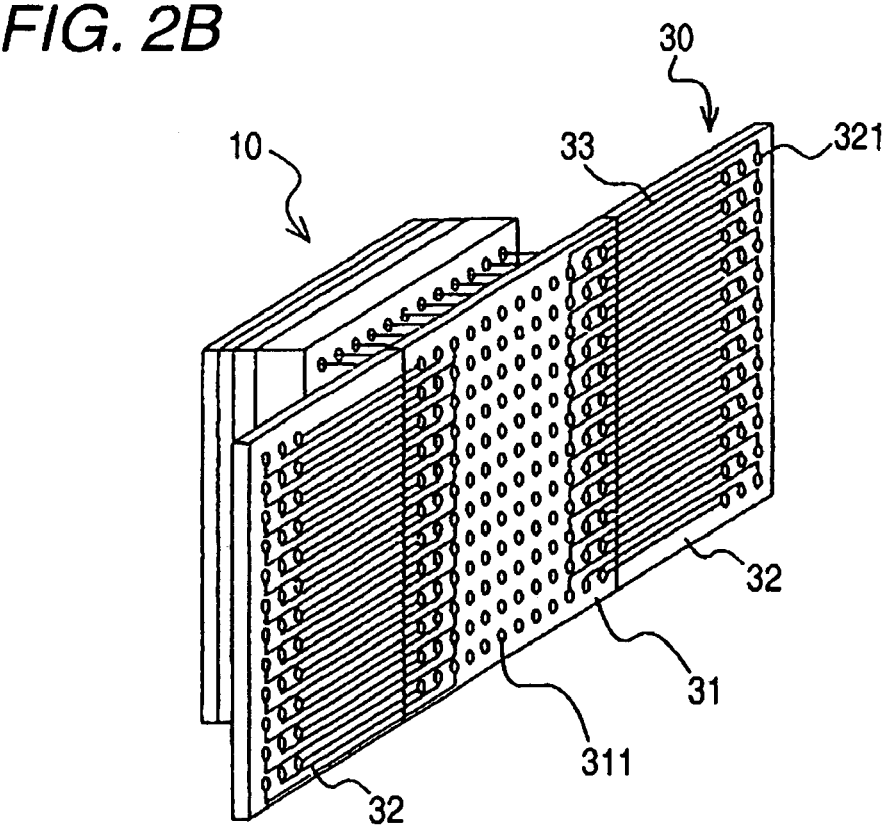

FIGS. 2A and 2B are perspective views showing the ultrasonic probe in the first exemplary embodiment of the invention. FIG. 2A is a perspective view of the ultrasonic transducer 10. FIG. 2B is a perspective view showing a positional relation of the ultrasonic transducer 10 and a board 30 in connecting the ultrasonic transducer 10 and the board 30. As shown in FIG. 2A, the connection leads 22 arranged two-dimensionally are electrically connected to the end sections 221 drawn out from the ultrasonic oscillating elements 16 of a two-dimensional array ultrasonic transducer, respectively. The connection leads 22 are formed of conductive metal and connected to the board 30 described later by soldering.

As shown in FIG. 2B, the board 30 includes a center section 31 (a first part) and end sections 32 (a second part). The center section 31 has through-holes 311 formed in association with the connection leads 22 such that the connection leads 22 can be inserted into the through-holes 311. The respective through-holes 311 include data lines to transmit signals to the end sections 32. The end sections 32 connect the data lines from the respective through-holes 311 to electrode pads 321 through data lines 33.

The end sections 32 may bend toward the center section 31 on boundary sections ("bent sections" in the figure) between the end sections 32 and the center section 31. Specifically, a flexible board, the center section 31 and the end sections 32 which bend flexibly, may be applied to the board 30. The end sections 32 may be made of a material which bends or warps toward the center section 31 or may be made of a material, only a part of which bends or warps.

The boundary sections (the bent sections) do not always have to be clearly provided. The board 30 may be a board that includes an area (the center section 31) that makes sure electrical connection with the connection leads 22 through the through-holes 311, areas (the end sections 32) that bend or warp toward the area and in which the electrode pads 321 are formed, and the data lines 33 that the through-holes 311 and the electrode pads 321 conductive.

The electrode pads 321 connect the ultrasonic transducer 10 and integrated circuits 45 directly or indirectly.

Figure 3:
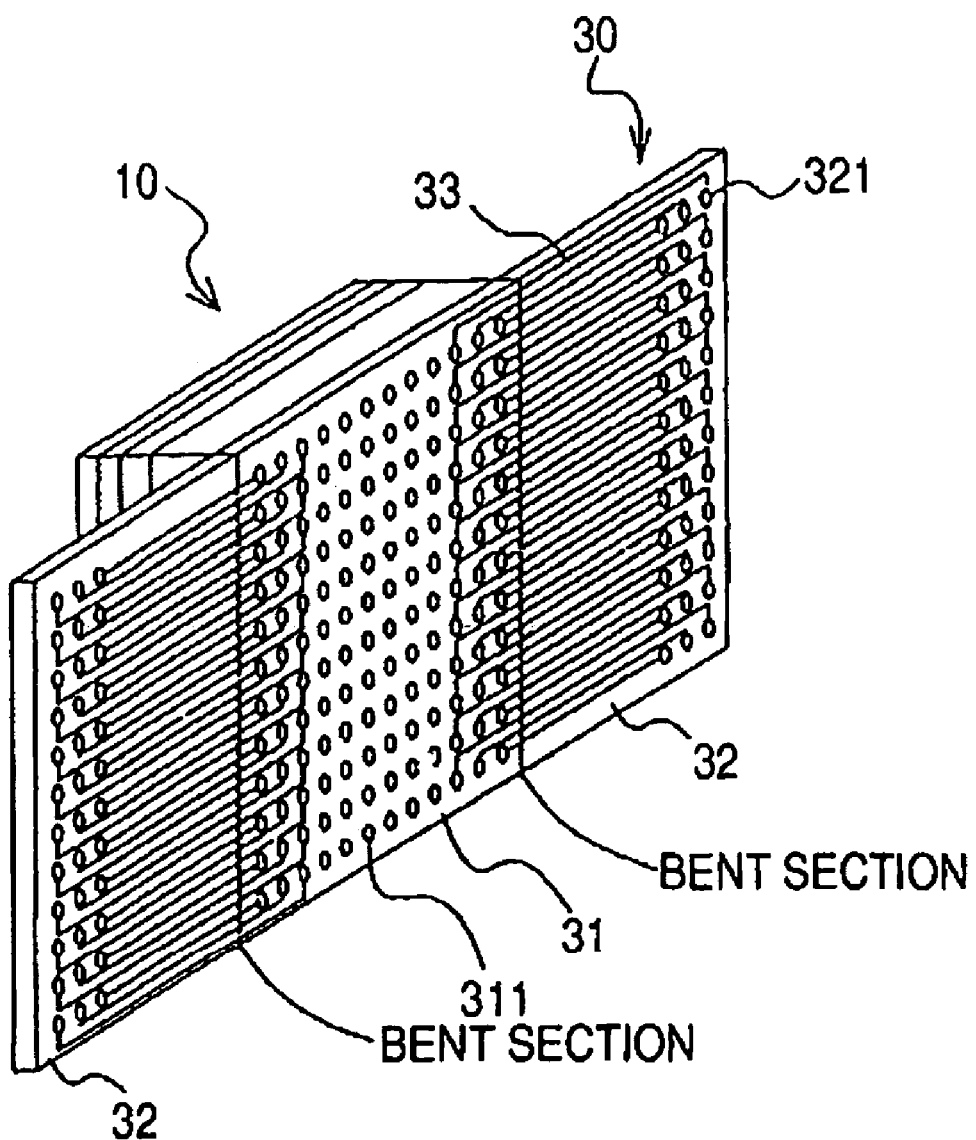
FIG. 3 is a perspective view showing how the ultrasonic transducer and the board of the ultrasonic probe in the first exemplary embodiment of the invention are connected.

FIG. 3 shows the ultrasonic transducer 10 connected to the board 30 as described above. FIGS. 4A and 4B show a relation of connecting positions among the ultrasonic transducer 10, IC boards 40 mounted with integrated circuits, and the board 30 in this exemplary embodiment.

Figure 5:
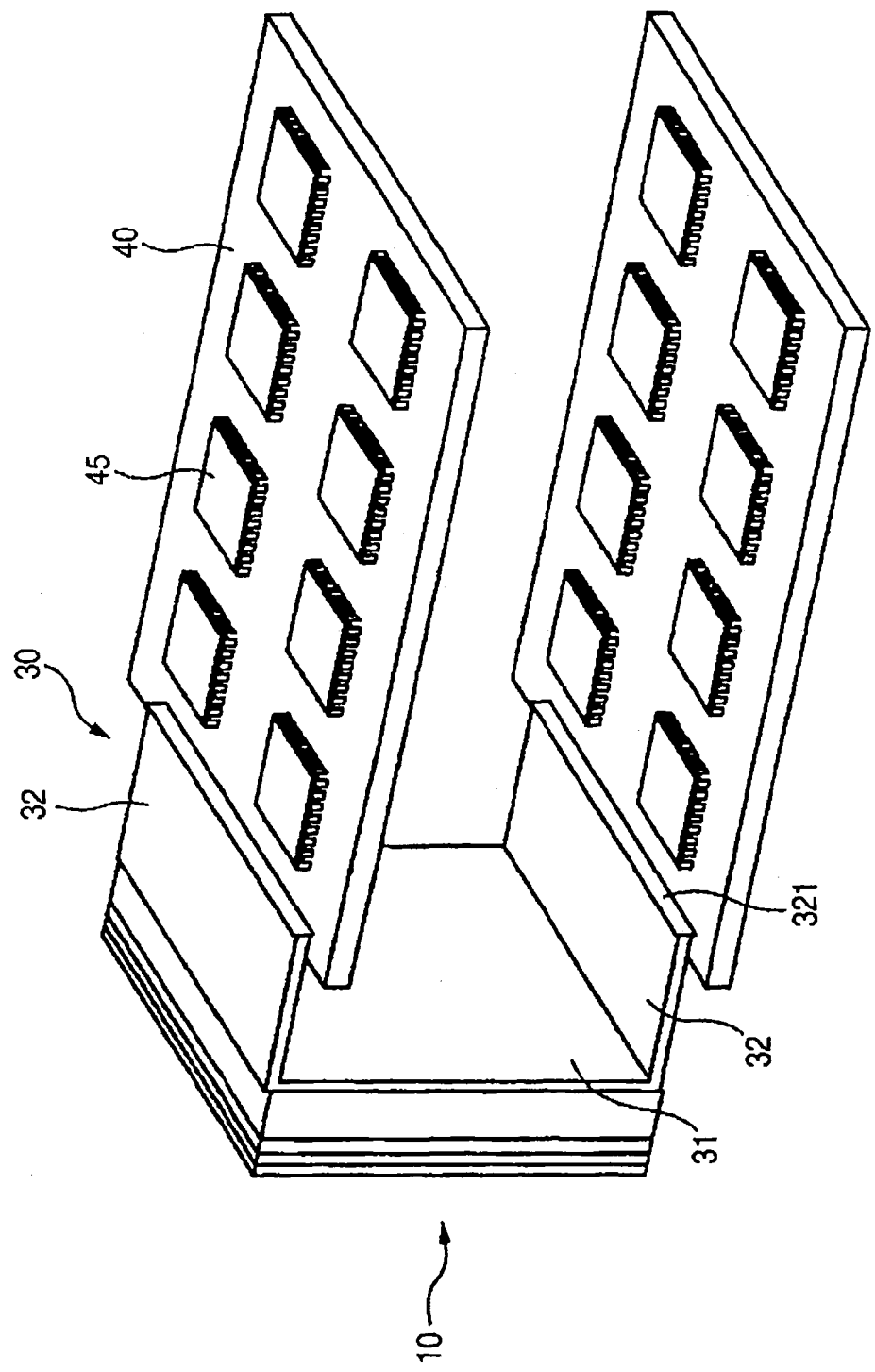
FIG. 5 is a perspective view showing the ultrasonic probe in the first exemplary embodiment of the invention.

As shown in FIG. 4B, the IC boards 40, such as rigid boards mounted with the integrated circuits 45, which process (e.g., amplify or switch) received signals, are connected to the electrode pads 321. In this exemplary embodiment, the end sections 32 are bent toward the center section 31 in boundary sections of the center section 31 and the end sections 32 (in the figure, "bent sections") to connect the IC boards 40 to the electrode pads 321. For example, when the board 30 provided with the two end sections 32 at both ends of the center section 31 is adopted, as shown in FIG. 5, the two end sections 32 are bent with the center section 31 fixed to the ultrasonic transducer 10 to connect the IC boards 40 to the electrode pads 321 formed near the end sides of the two end sections 32.

Note that, in FIG. 2B, FIG. 3, and FIGS. 4A and 4B, the data lines 33 are drawn out only from the through-holes 311 in three rows each, at both ends of the center section 31, among the through-holes 311 formed in the center section 31, and are connected to the electrode pads 321, respectively. However, it is also possible that the data lines 33 are drawn out from all the through-holes 311 formed in the center section 31 and the electrode pads 321 corresponding to the data lines 33 are formed.

In this exemplary embodiment, the data lines may be drawn out from all the through-holes 311 in a certain area. However, it is also possible that the data lines are not drawn out from all the through-holes 311, and the through-holes 311 from which the data lines are not drawn out, are located at random.

Advantages of such random connection are described below. It is convenient from the viewpoint of ease of processing to form a two-dimensional array ultrasonic transducer in a matrix shape and provide the connection leads 22 in all arrays thereof. However, from the viewpoint of formation of an image, all the ultrasonic oscillating elements 16 do not always have to be driven. Even if the ultrasonic oscillating elements 16 not being driven are present at random locations, it is possible to form an image. Since an arrangement of the ultrasonic oscillating elements 16 not being driven is random, the image is not clearly affected by the arrangement. If the ultrasonic oscillating elements 16 to be driven are reduced, since it is possible to reduce the number of signals to be lead out, the number of signals to be processed is reduced. This makes it possible to reduce a size of the two-dimensional array ultrasonic probe and reduce a diameter of cables therefor.

The through-holes 311 and the electrode pads 321 do not always have to be connected in a one-to-one relation. For example, the data lines 33 drawn out from the plural through-holes 311 may be connected to one electrode pad 321. The data lines 33 drawn out from one through-hole 311 may be connected to the plural electrode pads 321.

In this exemplary embodiment, the IC boards 40 mounted with the integrated circuits 45 are connected to the electrodes pads (multipole connectors) 321. However, the IC boards 40 do not always have to be connected to the electrode pads 321. The integrated circuits 45 may be directly connected to the electrode pads 321. The integrated circuits 45 may be mounted on the end sections 32 or the IC boards 40 and the integrated circuits 45 may be connected to the end sections 32 in a mixed state. With such a constitution, it is possible to reduce mounting space for members mounted on the end sections 32. This makes it possible to realize a reduction in a size of the ultrasonic probe.

In this exemplary embodiment, the board 30 includes the one center section 31 and the two end sections 32 provided at both side ends of the center section 31. However, three or more end sections 32 may be provided for the one center section 31 at a side end of the center section 31. Thus, even when the connection leads 22 are increased, it is possible to distribute drawing-out of data lines from the connection leads 22 via the through-holes 311 formed in the center section 31. Therefore, it is possible to set the integrated circuits 45 efficiently using spaces in the ultrasonic probe effectively. As a result, it is possible to realize a reduction in a size of the ultrasonic probe.

In this exemplary embodiment, the board 30 includes the one center section 31 and the two end sections 32 provided at both the side ends of the center section 31. However, one end section 32 may be provided for the one center section 31 at a side end of the center section 31.

Figure 6:
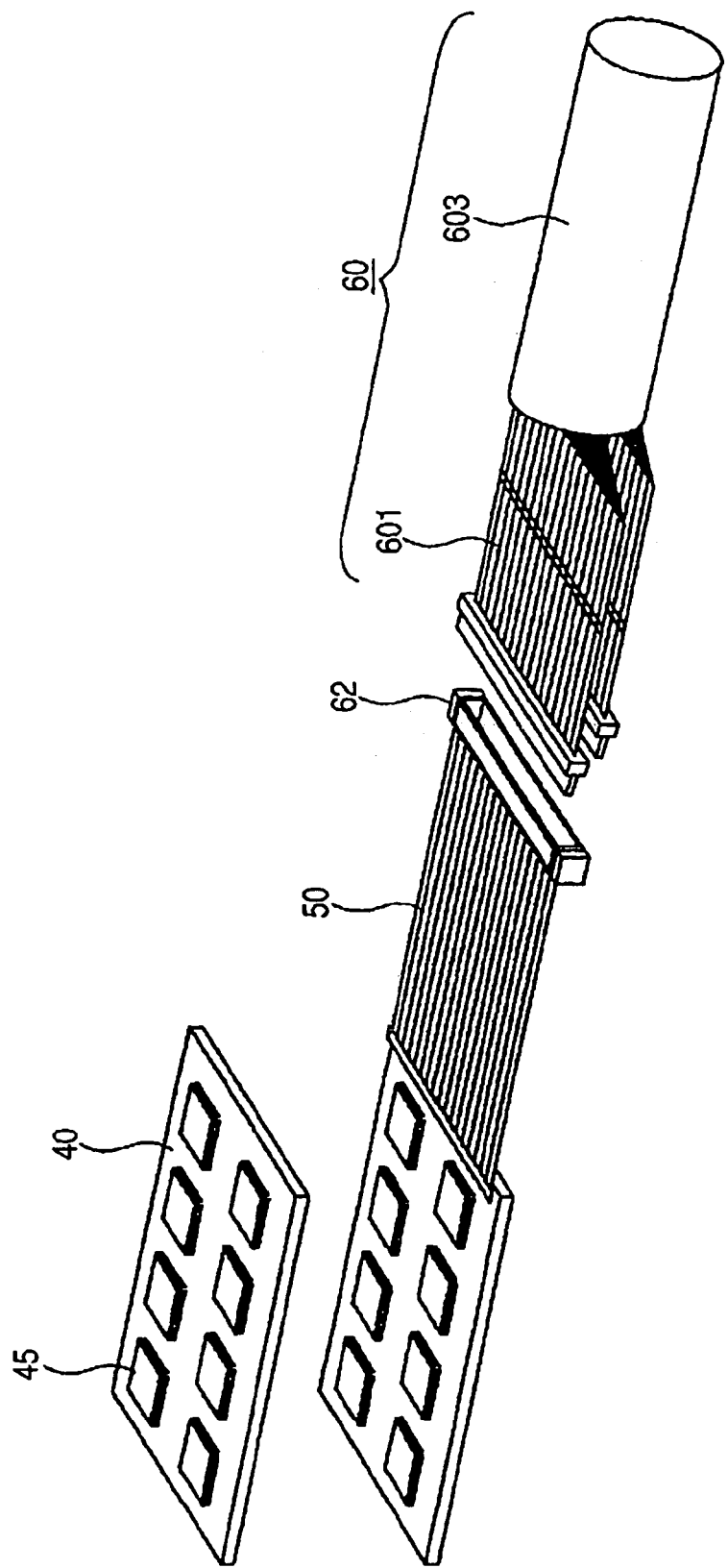
FIG. 6 is a perspective view showing the ultrasonic probe in the first exemplary embodiment of the invention.

FIG. 6 is a diagram for explaining a mechanism to connect a cable 60, which connects the ultrasonic probe and the main body of the ultrasonic diagnostic apparatus in the first exemplary embodiment of the invention, and the IC board 40.

As shown in FIG. 6, the cable 60 is a cable to electrically connecting the main body of the ultrasonic diagnostic apparatus and the IC board 40 and the like. The cable 60 includes an FPC for cable assembly 601 (a flexible printed board) and a cover 603 that covers the FPC for cable assembly 601. The cable 60 is flexible.

A cable connection board 50 is a board to connect the IC board 40 and the cable 60. The cable connection board 50 is made of a flexible FPC. One end of the cable connection board 50 is electrically connected to one end on the opposite side of an end of the IC board 40 where connection pins (not shown) are provided.

Connectors 62 are provided at the other end of the cable connection board 50 and one end of the FPC for cable assembly 601, respectively. The cable connection board 50 and the FPC for cable assembly 601 are electrically connected by the connectors 62.

According to the exemplary embodiment explained above, it is possible to draw out the refined data lines 33 from the connection leads 22 via the through-holes 311. Therefore, it is possible to efficiently set the integrated circuits 45 using spaces in the ultrasonic probe effectively. As a result, it is possible to realize a size reduction of the ultrasonic probe.

Compared with the relay board and connection pins in the related art example described in JP-A-2001-292496, it is possible to reduce a size of the arrangement of the connection sections (the connection leads 22) because a flexible board is used as the board 30 and warp of the board 30 is utilized. Therefore, it is possible to realize a size reduction of the ultrasonic probe.

If a flexible printed board including superimposed thin films is used as the board 30, in processing the board 30, it is possible to apply various thin-film processing techniques, such as etching and sputtering. A technique of microfabrication in a thin film is remarkably higher in accuracy compared with a processing technique in a tabular bulk. Therefore, it is possible to perform finer processing in the connection of the through-holes and the data lines 33. This makes it possible to reduce a size of the arrangement of the connection sections (the connection leads 22).

Moreover, the board 30 including the center section 31, in which the through-holes 311 are formed, and the end sections 32 to connect the board 30 to the integrated circuits 45 or the like, is interposed between the ultrasonic transducer 10 and the integrated circuits 45. Thus, a degree of freedom in forming the data lines 33 formed in the board 30 is increased. It is possible to provide the ultrasonic probe in which the integrated circuit 45 is packaged at high density near the ultrasonic transducer 10.

Second Exemplary Embodiment

An ultrasonic probe in a second exemplary embodiment of the invention will be described with reference to the drawings.

As a characteristic of this exemplary embodiment, plural boards 30 are provided. In this exemplary embodiment, the plural boards 30 are explained. Explanations of components identical with those in the first exemplary embodiment are omitted.

Figure 7:
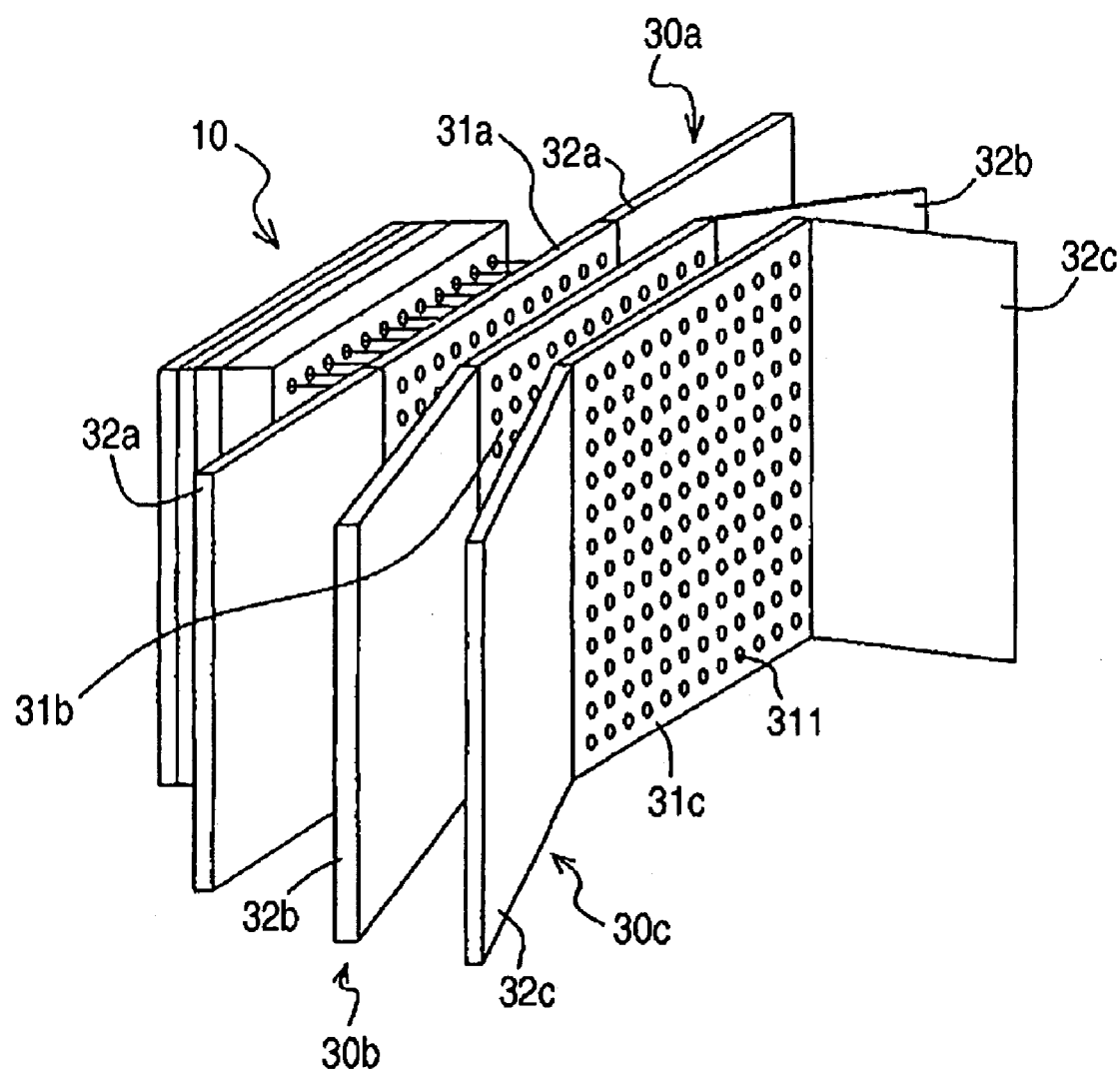
FIG. 7 is a perspective view showing an ultrasonic transducer and a board connected to the ultrasonic transducer of an ultrasonic probe in a second exemplary embodiment of the invention.

FIG. 7 is a perspective view showing the ultrasonic probe in the second exemplary embodiment of the invention. As shown in FIG. 7, in plural boards (a first board 30a, a second board 30b, and a third board 30c) provided to be superimposed on the connection leads 22 side of the ultrasonic transducer 10, sizes of center sections 31a, 31b, and 31c, arrangements of the through-holes 311, and shapes of end sections 32a, 32b, and 32c are set substantially the same, respectively.

The first board 30a, the second board 30b, and the third board 30c are different in the form of the through-holes 311 formed in the respective center sections 31. Specifically, the through-holes 311, which are through-holes not electrically connected to the connection leads 22, are also formed in at least any one of the center sections 31a, 31b, and 31c. The respective boards 30 are conductive to at least a part of the connection leads 22. As a whole, the boards 30 share all the connection leads 22 divided into predetermined areas (e.g., divided into three).

Note that the through-holes 311 provided in all the superimposed boards 30 may be conductive to all the connection leads 22, respectively.

Figure 8A:
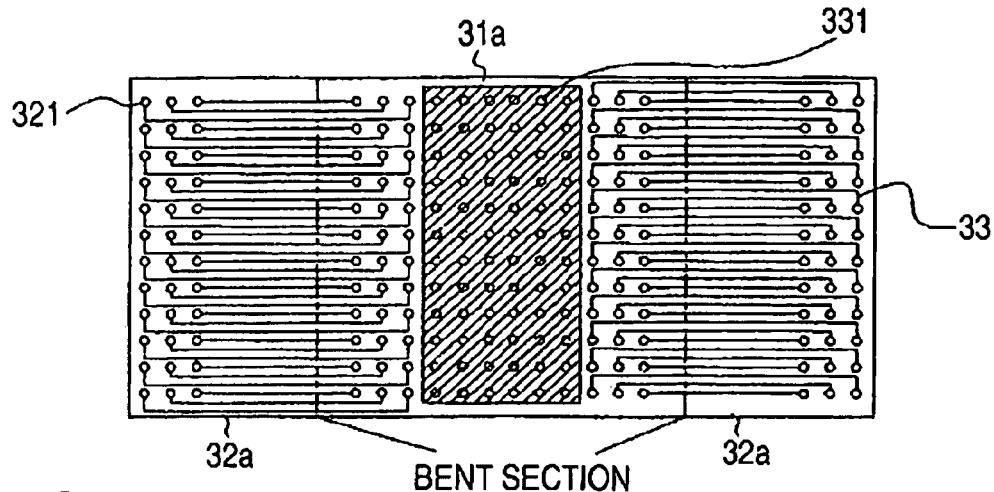
FIGS. 8A to 8C are plan views showing respective boards of the ultrasonic probe in the second exemplary embodiment of the invention.
Figure 8B:
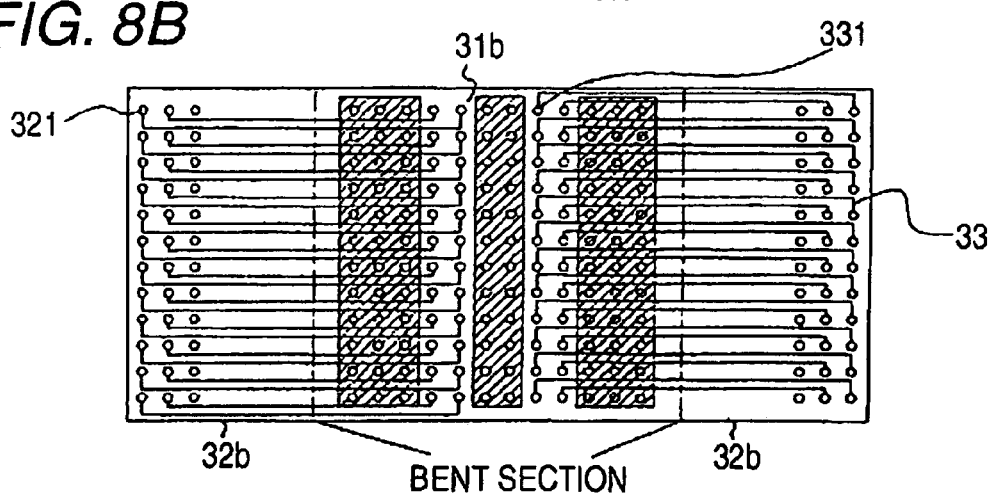
Figure 8C:
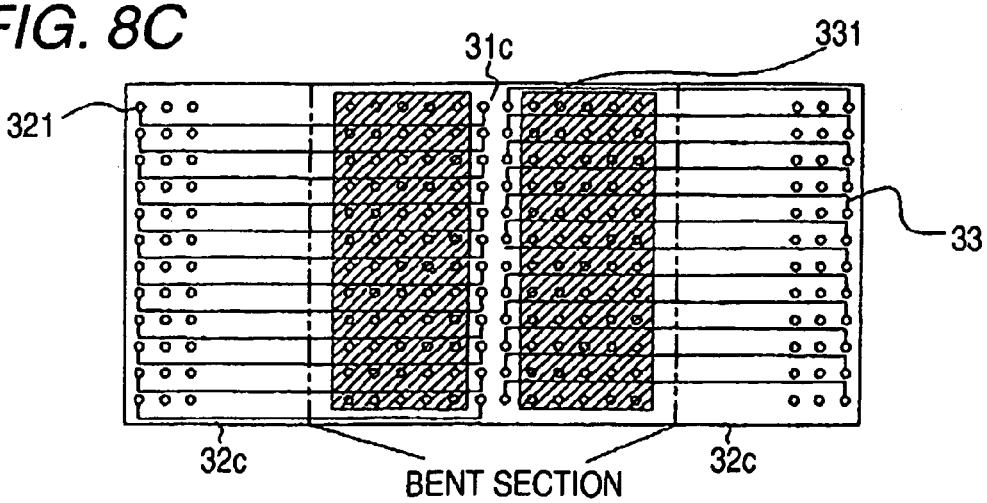

For example, as shown in FIGS. 8A to 8C, only a part of the through-holes 311 of the center sections 31a, 31b, and 31c, which are constituted in a 12×12 matrix in association with the connection leads 22 (not shown) constituted in 12×12 matrix, are drawn out by the data lines 33. In the first board 30a, the data lines 33 are drawn out from the through-holes 311 in three rows each near the bent sections of the center section 31a.

As shown in FIG. 8B, in the second board 30b, the data lines 33 are drawn out from the through-holes 311 in two rows each, specifically, a fourth row and a fifth row from the bent sections of the center section 31b.

As shown in FIG. 8C, in the third board 30c, the data lines 33 are drawn out from the through-holes 311 in one row each, specifically, a sixth row from the bent sections of the center section 31c. In this case, the through-holes 311 in the fourth to the sixth rows from the bent sections correspond to the through-holes 311, which are through-holes from which the data lines 33 are not drawn out, formed in the center section 31a (the through-holes 311 are indicated by hatching in the figure as a "nonconductive area"). The through-holes 311 in the first to the third rows and the through-holes 311 in the sixth row from the bent sections correspond to the through-holes 311, which are through-holes from which the data lines 33 are not drawn out, formed in the center section 31b (the through-holes 311 are indicated by hatching in the figure as "nonconductive areas"). The through-holes 311 in the first to the fifth rows from the bent sections correspond to the through-holes 311, which are through-holes from which the data lines 33 are not drawn out, formed in the center section 31c (the through-holes 311 are indicated by hatching in the figure as "nonconductive areas").

Note that, in this exemplary embodiment, the through-holes 311 belonging to the "nonconductive areas" in the respective center sections 31 are not electrically connected to the connection leads 22 as simple through-holes that do not draw out the data lines 33. However, it is also possible that the through-holes 311 belonging to the "nonconductive areas" are not connected by the electrode pads 321 formed in the respective end sections 32 and the data lines 33.

Figure 9:
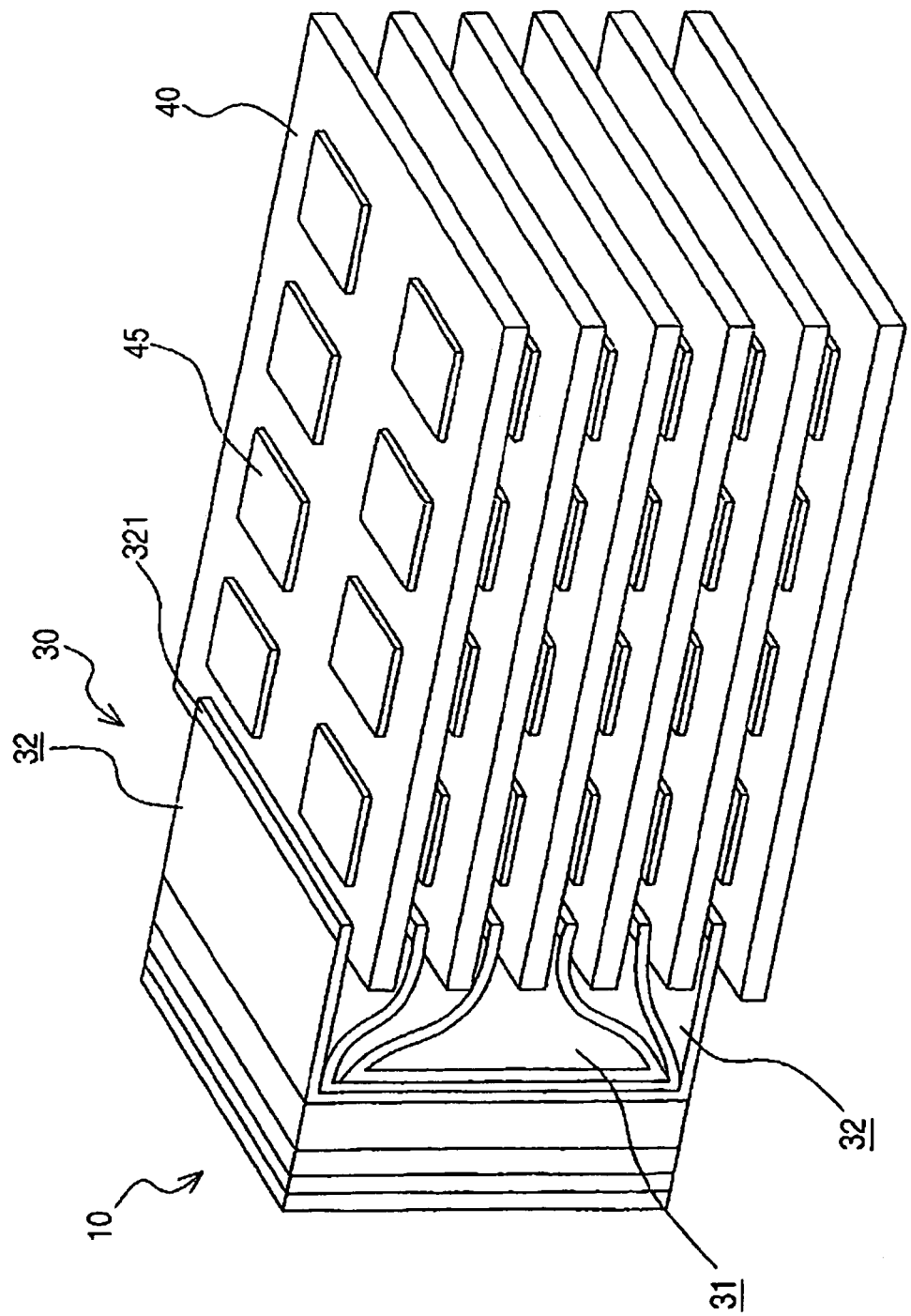
FIG. 9 is a perspective view showing the ultrasonic probe in the second exemplary embodiment of the invention.

As shown in FIG. 9, the IC boards 40 such as rigid boards mounted with the integrated circuits 45, which process (e.g., amplify or switch) received signals, are connected to the respective electrode pads 321. The respective electrode pads 321 are electrically connected to the respective connection leads 22 by being connected to the through-holes 311, which are formed in the respective boards 30a, 30b, and 30c, by the data lines 33. In this exemplary embodiment, the end sections 32 are bent toward the center sections 31 to connect the IC boards 40. For example, when the boards 30 including the two end sections 32 at both the ends of the center sections 31 are adopted, the two end sections 32 are bent about 90° with the center sections 31 fixed to the ultrasonic transducer 10. The IC boards 40 are connected to the electrode pads 321 formed near the end sides of the two end sections 32, respectively.

When flexible boards are adopted as the boards 30, the boards 30 only have to be warped without providing the bent sections of the center sections 31 and the end sections 32.

In this exemplary embodiment, the IC boards 40 mounted with the integrated circuits 45 are connected to the electrode pads 321. However, the IC boards 40 do not always have to be connected to the electrode pads 321. The integrated circuits 45 may be directly connected to the electrode pads 321. Specifically, the integrated circuits 45 may be mounted on the end sections 32. Alternatively, the IC boards 40 and the integrated circuits 45 may be connected to the end sections 32 in a mixed state. With such a constitution, it is possible to reduce a mounting space for members mounted on the end sections 32. Thus, it is possible to realize a reduction in a size of the ultrasonic probe.

In this exemplary embodiment, the board 30 includes the one center section 31 and the two end sections 32 provided at both ends of the center section 31. However, three or more end sections 32 may be provided for the one center section 31. With such a constitution, even when the connection leads 22 are increased, it is possible to further distribute drawing-out of data lines from the connection leads 22 via the through-holes 311 formed in the center section 31. Therefore, it is possible to set the integrated circuits 45 efficiently using spaces in the ultrasonic probe effectively. As a result, it is possible to realize a further size reduction in the ultrasonic probe.

Figure 10:
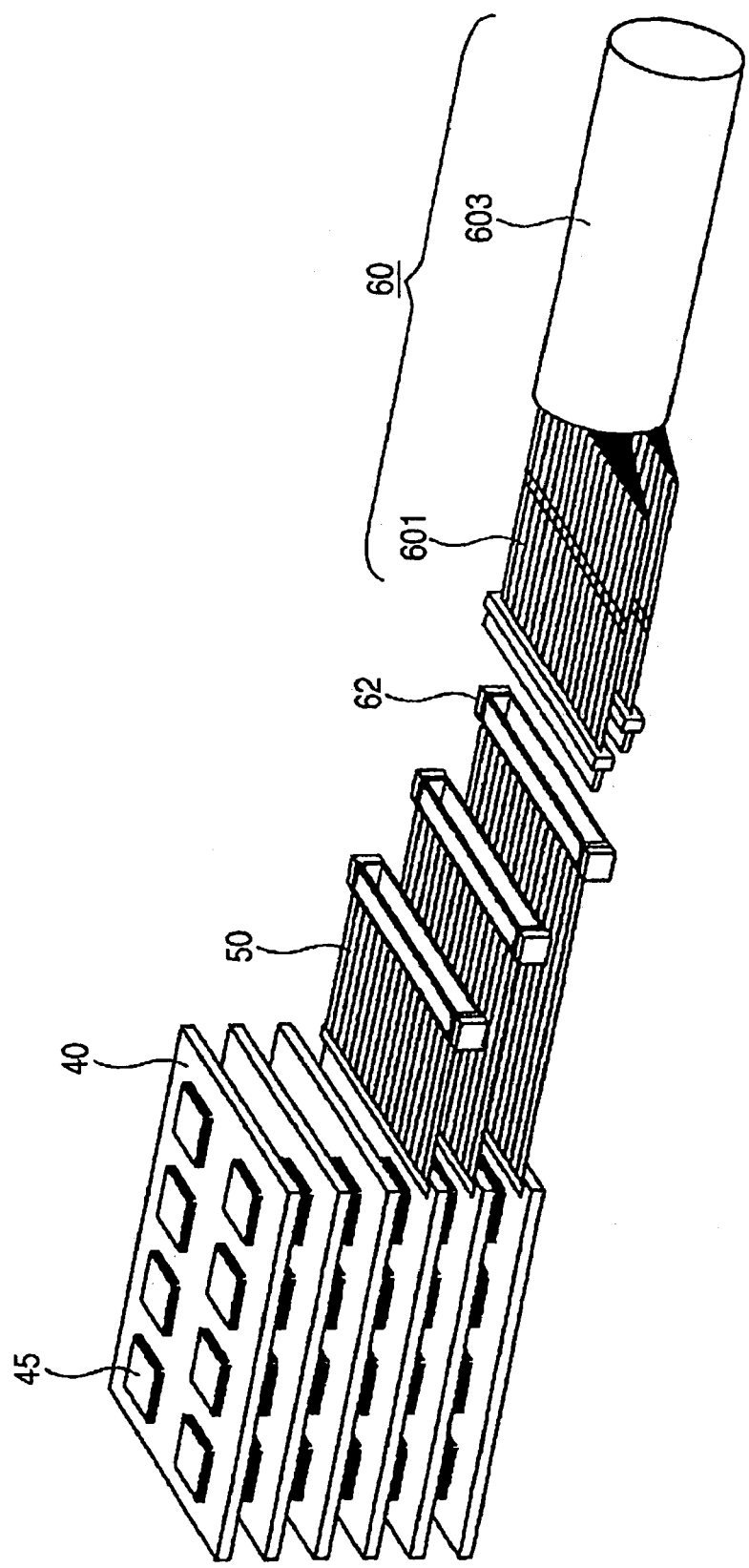
FIG. 10 is a perspective view showing the ultrasonic probe in the second exemplary embodiment of the invention.

FIG. 10 is a diagram for explaining a mechanism to connect the cable 60, which connects the ultrasonic probe and the main body of the ultrasonic diagnostic apparatus in the second exemplary embodiment of the invention, and the IC boards 40.

As shown in FIG. 10, the cable 60 is a cable to electrically connect the main body of the ultrasonic diagnostic apparatus and the IC board 40 and the like. The cable 60 includes the FPC for cable assembly 601 (a flexible printed board) and the cover 603 that covers the FPC for cable assembly 601. The cable 60 is flexible.

The cable connection boards 50 are boards to connect the IC boards 40 and the cable 60. The cable connection boards 50 are made of a flexible FPC. One end of the cable connection boards 50 are electrically connected to one end on the opposite side of end of the IC boards 40, where connection pins (not shown) are provided.

The connectors 62 are provided at the other end of the cable connection boards 50 and one end of the FPC for cable assembly 601, respectively. The cable connection boards 50 and the FPC for cable assembly 601 are electrically connected by the connectors 62.

According to the exemplary embodiment explained above, it is possible to distribute conduction of the respective connection leads 22 of the ultrasonic transducer 10 using the through-holes 311, the data lines 33, and the electrode pads 321 that are formed on the superimposed boards 30, respectively.

This makes it possible to arrange the electrode pads 321, specifically, the IC boards 40 according to a way of forming the data lines 33 without depending on the arrangement of the connection leads 22.

Each of the data lines 33 has to be conductive to the end sections 32 through spaces among the through-holes 311 and the other data lines 33. However, in this exemplary embodiment, conduction from the connection leads 23 is distributed to each of the superimposed boards 30. Therefore, in particular, in the center section 31 where the through-holes 311 are formed, it is possible to give room to wiring of the data lines 33. This makes it possible to draw out a large number of data lines 33 while keeping the arrangement of the connection leads 22 small.

Since the flexible board is adopted as the board 30, it is possible to easily perform connection in both a case in which the flexible board and a board mounted with integrated circuits and the like are connected in advance and, then, the flexible board and the board are coupled to connection leads and a case in which the connection leads and the flexible board are coupled and, then, the connection leads and the flexible board are connected to the board mounted with the integrated circuits and the like.

Since the board on which data lines and through-holes to electrically connect the connection leads and electrode pads (IC boards) are formed is adopted, electrical connection is made possible only by inserting the connection leads into the through-holes. This makes it unnecessary to perform positioning at the time of connection and makes connection work easy.

Since it is possible to couple plural flexible boards simultaneously and in the same manner using the connection leads, it is possible to connect all the flexible boards in the same work. Thus, workability in manufacturing is enhanced.

Third Exemplary Embodiment

An ultrasonic probe in a third exemplary embodiment of the invention will be explained with reference to the drawings.

As a characteristic of this exemplary embodiment, as opposed to the first and the second exemplary embodiments, the plural boards 30a, 30b, and 30c are not superimposed on the center sections 31a, 31b, and 31c, respectively, and each of the boards 30a, 30b, and 30c includes the center section 31, in which through-holes are provided only in a part of the connection leads 22, and one end section 32 at one side ends thereof. In this exemplary embodiment, a constitution of the plural boards 30 is explained. Explanations of components identical with those in the first and the second exemplary embodiments are omitted.

Figure 11:
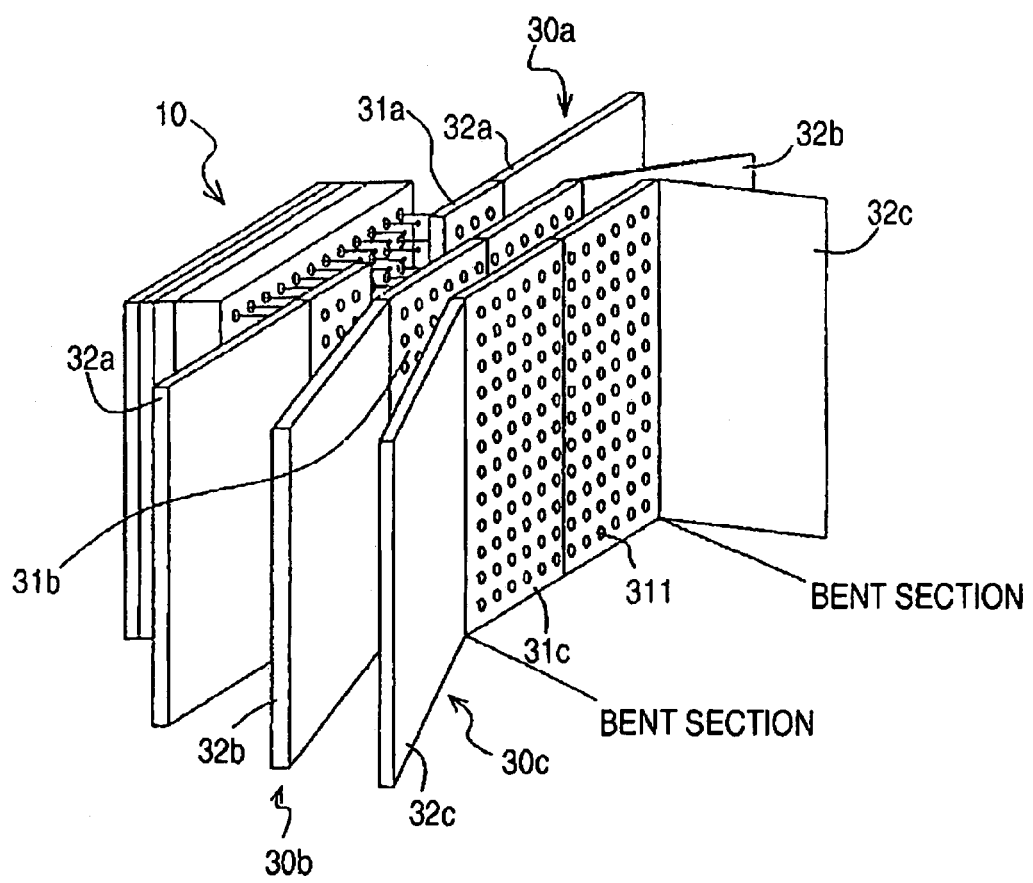
FIG. 11 is a perspective view showing an ultrasonic transducer and a board connected to the ultrasonic transducer of an ultrasonic probe in a third exemplary embodiment of the invention.

FIG. 11 is a perspective view showing a constitution of the ultrasonic probe in the third exemplary embodiment of the invention. As shown in FIG. 11, a size of the center sections 31a, 31b, and 31c of the respective boards (the first boards 30a, the second boards 30b, and the third boards 30c) is set according to an arrangement of the connection leads 22 to be conductive. Ends 32a, 32b, and 32c are provided at one side ends of the respective center sections 31a, 31b, and 31c.

Figure 12A:
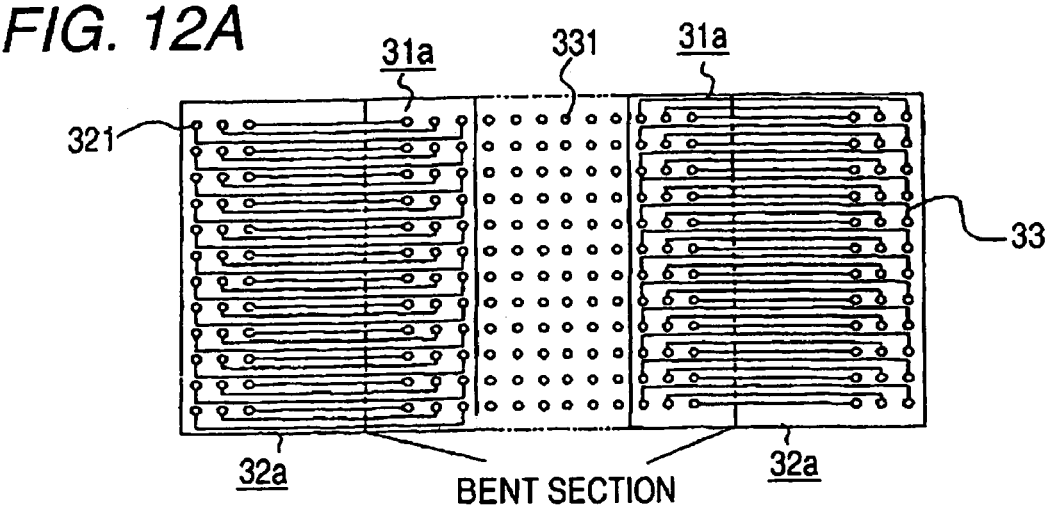
FIGS. 12A to 12C are plan views showing respective boards of the ultrasonic probe in the third exemplary embodiment of the invention.

For example, as shown in FIG. 12A, for the connection leads 22 (not shown) constituted in a 12×12 matrix, the two first boards 30a include the center sections 31a, the data lines 33, and the end sections 32a, respectively. The center sections 31a have the through-holes 311 corresponding to three rows each from both the end sides of the connection leads 22. The data lines 33 are drawn out from the respective through-holes formed in the center sections 31a. In the end sections 32a, the electrode pads 321 are formed.

Figure 12B:
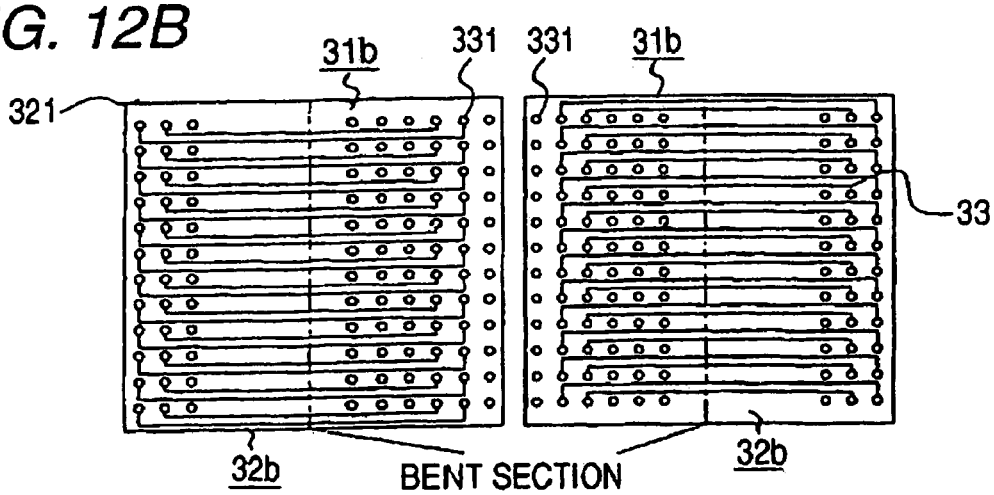

As shown in FIG. 12B, for the connection leads 22 (not shown) constituted in a 12×12 matrix, the two second boards 30b include the center sections 31b, the data lines 33, and the end sections 32b, respectively. In the center sections 31b, the through-holes 311 are formed in a 12×6 matrix in order to draw out the data lines 33 from the through-holes 311 corresponding to the fourth row and the fifth row from both the end sides of the connection leads 22. The data lines 33 are drawn out from the through-holes 311 corresponding to the fourth row and the fifth row from both the end sides of the connection leads 22 among the through-holes 311 formed in the center sections 31b. In the end sections 32b, the electrode pads 321 are formed.

Figure 12C:
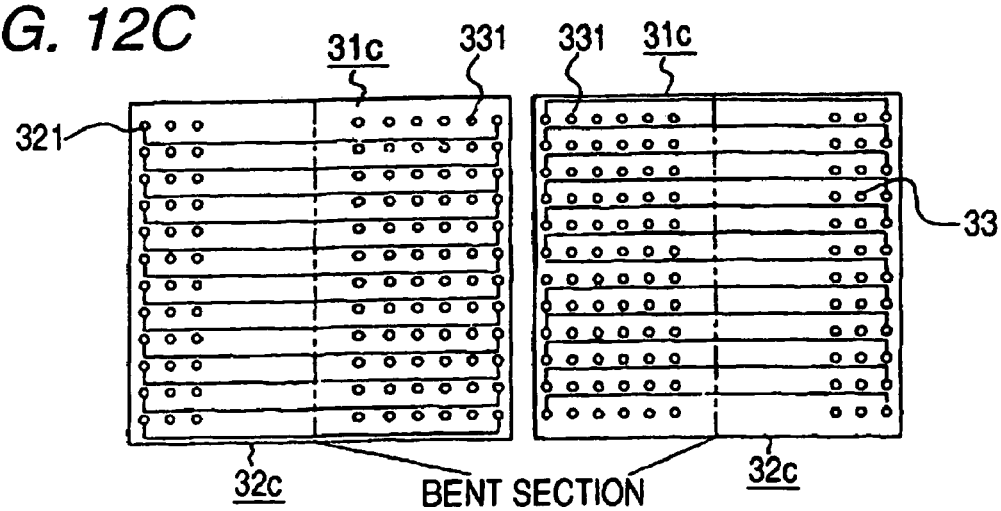

As shown in FIG. 12C, for the connection leads 22 (not shown) constituted in a 12×12 matrix, the two third boards 30c include the center sections 31c, the data lines 33, and the end sections 32c, respectively. In the center sections 31c, the through-holes 311 are formed in a 12×6 matrix in order to draw out the data lines 33 from the through-holes 311 corresponding to the sixth row from both the end sides of the connection leads 22. The data lines 33 are drawn out from the through-holes 311 corresponding to the sixth row from both the end sides of the connection leads 22 among the through-holes 311 formed in the center sections 31c. In the end sections 32c, the electrode pads 321 are formed.

Note that the through-holes 311, to not be conductive to the connection leads 22 in the center sections 31, do not have to be electrically connected to the connection leads 22 as simple through-holes. The through-holes 311 to not be conductive to the connection leads 22 in the center sections 31 do not have to be connected by the electrode pads 321 and the data lines 33 formed in the respective end sections 32.

According to this exemplary embodiment, a size of the center sections 31 is changed according to an arrangement on the side of the connection leads 22, which are desired to be conductive, without depending on a size of a surface on the connection leads 22 side of the ultrasonic transducer 10. Thus, it is possible to reduce manufacturing cost for the boards 30 and realize partial leading-out of signals from the connection leads 22 effectively.

Fourth Exemplary Embodiment

An ultrasonic probe in a fourth exemplary embodiment of the invention will be explained with reference to the drawings.

In this exemplary embodiment, unlike the first to the third exemplary embodiments, the connection leads 22 formed in the ultrasonic transducer 10 are not connected to the board 30. As a characteristic of this exemplary embodiment, a relay board 70, in which an arrangement interval (pitch) and/or an arrangement order of the connection leads 22 is changed, is interposed between the ultrasonic transducer 10 and the board 30. In this exemplary embodiment, a constitution of the relay board 70 is explained. Explanations of components identical with those in the first and the second exemplary embodiments are omitted.

Figure 13A:
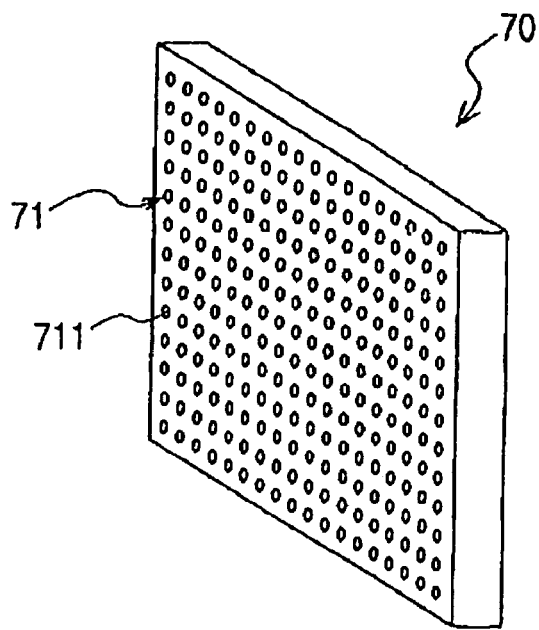
FIGS. 13A and 13B are perspective views showing a relay board of an ultrasonic probe in a fourth exemplary embodiment of the invention.
Figure 13B:
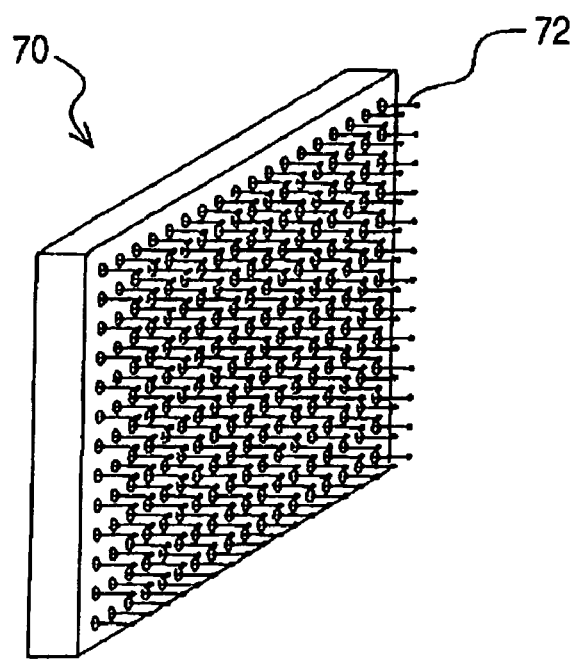

FIGS. 13A and 13B are perspective views showing the constitution of the relay board 70 in this exemplary embodiment. As shown in FIGS. 13A and 13B, the relay board 70 includes a first surface on which electrodes 71 connected to the connection leads 22 of the ultrasonic transducer 10 are formed and a second surface that is opposed to the first surface and on which second connection leads 72 are arranged.

As shown in FIG. 13A, holes 711 to insert the respective connection leads 22 are formed on the first surface of the relay board 70 in association with the arrangement of the connection leads 22 provided in the ultrasonic transducer 10. Electrodes (not shown) electrically to connect to the connection leads 22 inserted in the holes 711 are provided at bottoms of the respective holes 711. In the explanation of this exemplary embodiment, the holes 711 and the electrodes are generally referred to as the electrodes 71.

As shown in FIG. 13B, second connection leads 72 electrically connected to the electrodes 71 are two-dimensionally arranged on the second surface of the relay board 70. The second connection leads 72 are formed of conductive metal and may be connected to the second surface of the relay board 70 by brazing.

Figure 14:
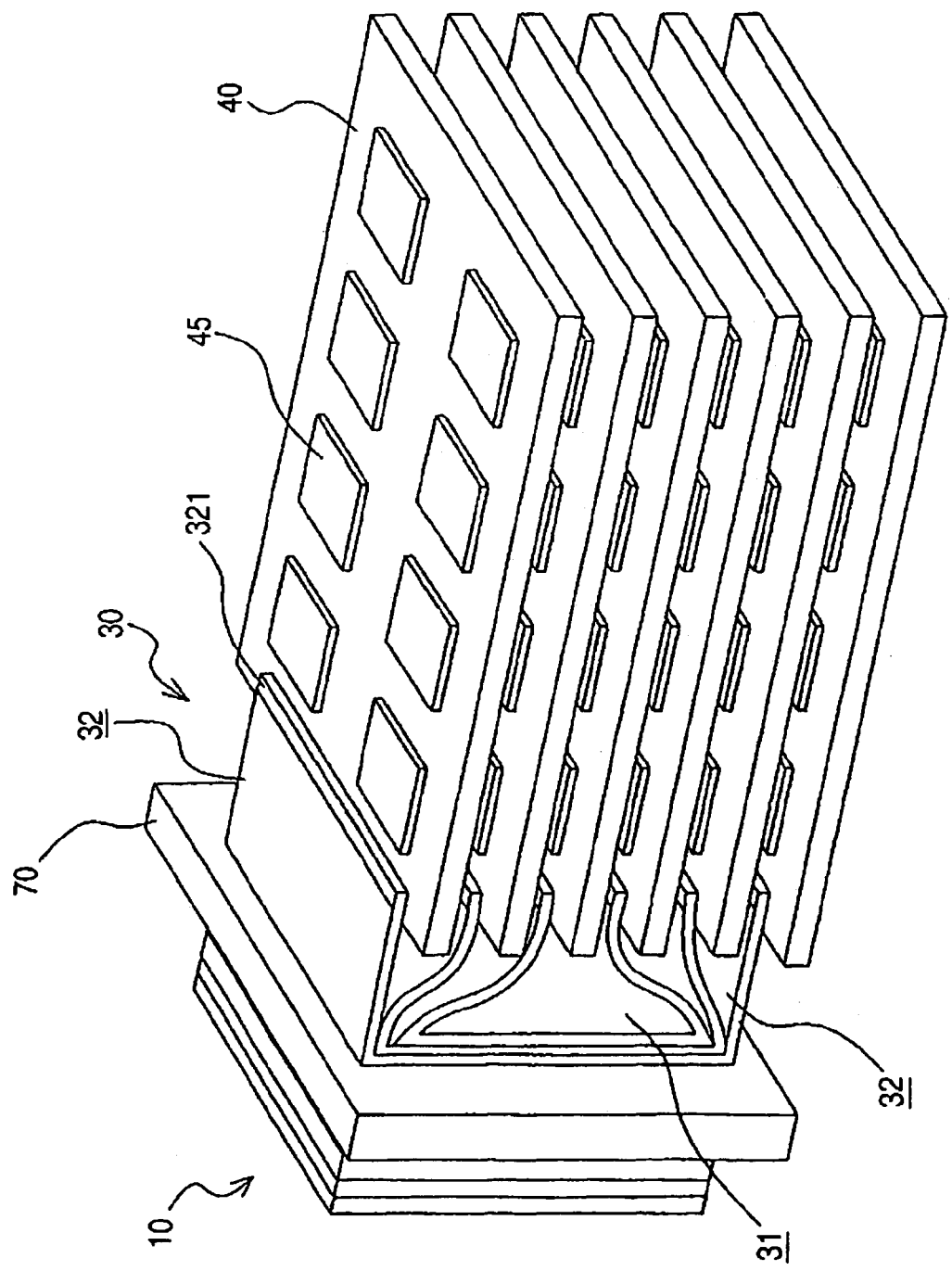
FIG. 14 is a perspective view showing the ultrasonic probe in the fourth exemplary embodiment of the invention.

As shown in FIG. 14, the connection leads 22 of the ultrasonic transducer 10 are connected to the electrodes 71 of the relay board 70. The second connection leads 72 of the relay board 70 are inserted into and connected to the through-holes 311 of the board 30. Consequently, the integrated circuits 45 mounted on the IC boards 40, which are connected to the electrode pads 321 of the board 30, and the ultrasonic transducers 10 are electrically connected.

The IC boards 40 in this exemplary embodiment are also rigid boards mounted with the integrated circuits 45 that process (e.g., amplify or switch) transmission and reception signals in the same manner as the exemplary embodiments described above. The IC boards 40 have the connection pins 401 corresponding to an arrangement interval (pitch) of the electrode pads 321 of the board 30, which is connected via the relay board 70, at one end thereof.

Although not shown in FIG. 14, as in the exemplary embodiments described above, a cable to electrically connect the ultrasonic probes and the main body of the ultrasonic diagnostic apparatus and a cable connection board to connecting the cable and the IC boards 40 are also provided in this exemplary embodiment.

According to the relay board 70 constituted in this way, an arrangement interval (pitch) and an arrangement order of the second connection leads 72 arranged on the second surface are not affected by an arrangement interval (pitch) and an arrangement order of the connection leads 22 (do not have to be the same as the arrangement interval (pitch) and the arrangement order of the connection leads 22). It is possible to select wiring between the electrodes 71 and the second connection leads 72 freely.

For example, the relay board 70 is constituted by a multilayer board. A pattern to change an arrangement interval (pitch) and an arrangement order (a connection pattern to change connection between the connection leads 22 and the connection pins 401 of the IC boards 40 to one-to-one connection, plural-to-one connection, and one-to-plural connection) is provided in an intermediate layer thereof. This makes it possible to secure a connection form of the through-holes 311 formed in the board 30 and the electrode pads 321 in the exemplary embodiments described above.

Therefore, in addition to the function of the board 30 provided to enhance a degree of freedom of capacity of the IC boards 40 mounted with the integrated circuits 45, a degree of freedom is given to connection between the connection leads 22 and the integrated circuits 45. Thus, it is possible to realize high-density packaging of the integrated circuits 45.

The exemplary embodiments described above are examples of the invention. The invention is not limited to the exemplary embodiments. In the exemplary embodiments, a board used in the ultrasonic probe is explained. However, it is possible to similarly apply the invention to an exemplary embodiment in which, via a board, integrated circuits and another board mounted with the integrated circuits are connected to connection leads projected in a matrix shape. It is possible to obtain the same advantages as the advantages obtained by the exemplary embodiments of the invention. Various modifications of the invention are possible according to designs and the like without departing from the technical idea of the invention.

What is claimed is:

1. An ultrasonic probe, comprising:
    a plurality of ultrasonic oscillating elements arranged in a two-dimensional array;
    a plurality of connection leads connected to the plurality of ultrasonic oscillating elements; and
    a plurality of first boards to connect the plurality of ultrasonic oscillating elements with at least one integrated circuit and overlapping one another, wherein each of the first boards includes,
        a first part having through-holes, such that the connection leads pass through plural through-holes in respective of the plurality of first boards, and such that the through-holes are electrically connected to at least a part of the connection leads and are not connected to other of the first boards when the connection leads are inserted into the through-holes, and
        at least one second part, a part of which is formed to be bendable, that connects the first part and the at least one integrated circuit.

2. An ultrasonic probe according to claim 1, wherein the at least one integrated circuit is mounted on the at least one second part.

3. An ultrasonic probe according to claim 1, further comprising:
at least one second board mounted with at least one integrated circuit and connected to the at least one second part.

4. An ultrasonic probe according to claim 1, wherein the plurality of first boards comprise flexible boards.

5. An ultrasonic probe, comprising:
a plurality of ultrasonic oscillating elements arranged in a two-dimensional array shape;
a relay section having a plurality of connection leads connected to the plurality of ultrasonic oscillating elements; and
a plurality of first boards to connect the relay section and at least one integrated circuit and overlapping each other, wherein each of the first boards includes,
a first part having through-holes, such that the connection leads pass through plural through-holes in respective of the plurality of first boards, and such that the through-holes are electrically connected to a part of the plurality of connection leads not to be connected to other of the first boards when the plurality of connection leads are inserted into the through-holes, and
at least one second part having a bendable portion configured to connect the first part and the at least one integrated circuit.

6. An ultrasonic probe according to claim 5, wherein the at least one integrated circuit is mounted on the at least one second part.

7. An ultrasonic probe according to claim 5, further comprising:
at least one second board mounted with the at least one integrated circuit and connected to the at least one second part.

8. An ultrasonic probe according to claim 5, wherein the plurality of first boards comprise flexible boards.

9. An ultrasonic probe, comprising:
a plurality of ultrasonic oscillating elements arranged in a two-dimensional array;
a plurality of connection leads connected to the ultrasonic oscillating elements; and
a plurality of first boards that connect the plurality of ultrasonic oscillating elements and at least one integrated circuit and overlapping each other, each first board including a first part having through-holes, such that the connection leads pass through plural through-holes in respective of the plurality of first boards, to insert a part of the plurality of connection leads not to be connected to other of the first boards, and at least one second part that connects the first part and the at least one integrated circuit and has bendable portions, wherein
the plurality of connection leads have portions electrically connected to the through-holes into which the plurality of connection leads are inserted.

10. An ultrasonic probe according to claim 9, wherein the first parts of the respective plurality of first boards are provided to be laid one on top of another.

11. An ultrasonic probe according to claim 9, wherein the at least one integrated circuit is mounted on the at least one second part.

12. An ultrasonic probe according to claim 9, wherein at least one second board mounted with the at least one integrated circuit is connected to the at least one second part.

13. An ultrasonic probe according to claim 9, wherein the plurality of first boards comprise flexible boards.

14. An ultrasonic probe, comprising:
a plurality of ultrasonic oscillating elements arranged in a two-dimensional array shape;
a relay section having a plurality of connection leads connected to the plurality of ultrasonic oscillating elements;
a plurality of first boards that connect the relay section and at least one integrated circuit and overlapping each other, each first board including a first part having through-holes such that the connection leads pass through plural through-holes in respective of the plurality of first boards, to insert a part of the plurality of connection leads not to be connected to other of the first boards, and at least one second part that connects the first part and the at least one integrated circuit and has a bendable portion; and
the plurality of connection leads being electrically connected to the through-holes into which the plurality of connection leads are inserted.

15. An ultrasonic probe according to claim 14, wherein the first parts of the respective plurality of first boards are provided to be laid one on top of another.

16. An ultrasonic probe according to claim 14, wherein the at least one integrated circuit is mounted on the at least one second part.

17. An ultrasonic probe according to claim 14, wherein at least one second board mounted with the at least one integrated circuit is connected to the at least one second part.

18. An ultrasonic probe according to claim 14, wherein the plurality of first boards comprise flexible boards.

* * * * *